United States Patent
Hicks et al.

(10) Patent No.: US 9,330,316 B2
(45) Date of Patent: May 3, 2016

(54) SENSOR LOCATION AND LOGICAL MAPPING SYSTEM

(71) Applicant: Simmonds Precision Products, Inc., Vergennes, VT (US)

(72) Inventors: Brandon Robert Hicks, Lexington, MA (US); Garret Edward Rittenhouse, Burlington, VT (US)

(73) Assignee: SIMMONDS PRECISION PRODUCTS, INC., Vergennes, VT (US)

( * ) Notice: Subject to any disclaimer, the term of this patent is extended or adjusted under 35 U.S.C. 154(b) by 142 days.

(21) Appl. No.: 14/190,466

(22) Filed: Feb. 26, 2014

(65) Prior Publication Data
US 2015/0063633 A1    Mar. 5, 2015

Related U.S. Application Data

(60) Provisional application No. 61/870,557, filed on Aug. 27, 2013.

(51) Int. Cl.
| | |
|---|---|
| *G06K 9/00* | (2006.01) |
| *G06F 21/44* | (2013.01) |
| *H04L 29/06* | (2006.01) |

(Continued)

(52) U.S. Cl.
CPC ............ *G06K 9/00771* (2013.01); *G06F 21/44* (2013.01); *G06K 9/0063* (2013.01); *H04L 63/08* (2013.01); *H04L 63/107* (2013.01); *H04W 4/02* (2013.01); *H04W 4/185* (2013.01); *G06F 2221/2111* (2013.01); *H04L 67/12* (2013.01); *H04W 4/005* (2013.01)

(58) Field of Classification Search
CPC ............ G06K 9/00771; G06K 9/0063; G06F 9/4418; G06F 11/1438; G06F 11/1441; G06F 17/30; G06F 21/44; G06F 21/575; G06T 7/2006; G06T 7/2033; G08B 13/19602; H04L 63/08; H04L 9/107; H04L 63/12; H04W 4/005; H04W 4/02; H04W 4/185; G01S 7/2922; G01S 13/522; G01S 13/723; G01S 13/86; G01S 13/867; G01S 13/886
See application file for complete search history.

(56) References Cited

U.S. PATENT DOCUMENTS

| | | | |
|---|---|---|---|
| 9,087,213 B2* | 7/2015 | Skaaksrud | ........... G06F 21/6245 |
| 2006/0200307 A1* | 9/2006 | Riess | ................. G06K 9/00785 |
| | | | 701/408 |

(Continued)

OTHER PUBLICATIONS

Extended European Search Report; European Application No. 14182197.5-1870/2843582; Date of Mailing: Feb. 5, 2015; pp. 1-8.

(Continued)

*Primary Examiner* — Jose Couso
(74) *Attorney, Agent, or Firm* — Cantor Colburn LLP (57) ABSTRACT

A system to locate and map a data collection device includes at least one image. The image may be included with a subsystem or a component monitored by the system. A data collection device, such as a smart sensor, is configured to detect a stimulus and to capture the at least one image. The smart sensor is further configured to output an image signal indicating the at least one image. A main control module is in electrical communication with the at least one smart sensor. The main control module is configured to determine the image based on the image signal, and compare the at least one image to a stored image. The main control module is further configured to authenticate the at least one image in response to the at least one image matching the stored image.

13 Claims, 4 Drawing Sheets

(51) Int. Cl.
*H04W 4/02* (2009.01)
*H04W 4/18* (2009.01)
*H04L 29/08* (2006.01)
*H04W 4/00* (2009.01)

(56) References Cited

U.S. PATENT DOCUMENTS

2012/0212323 A1 8/2012 Skaaksrud et al.

2014/0036076 A1* 2/2014 Nerayoff ............... H04N 7/181
348/148

OTHER PUBLICATIONS

Lopez De Ipina et al., "TRIP: A Low-Cost Vision-Based Location System for Ubiquitous Computing", Personal and Ubiquitous Computing, May 1, 2002, pp. 206-219.

* cited by examiner

SENSOR LOCATION AND LOGICAL MAPPING SYSTEM

CROSS-REFERENCE TO RELATED APPLICATION

This application is a non-provisional of U.S. Patent Application Ser. No. 61/870,557, filed Aug. 27, 2013, the disclosure of which is incorporated by reference herein in its entirety.

BACKGROUND

The present disclosure generally relates to a location and mapping system, and more specifically, to a sensor location and mapping system.

Electrical systems, such as aircraft electrical systems for example, typically include various sensors that detect various surrounding conditions. It is typically necessary to unambiguously identify the sensors in order for data collected by the system to be meaningful and/or to perform proper operation of a corresponding sub-system.

Conventional wired systems typically use a one-to-one connection (i.e. each device is directly connected to data concentrators in a particular manner) which allows the sensor to be identified. The identification, however, is typically performed by manually inputting the location data into the system. This method is cumbersome and susceptible to human error. Further, conventional logical mapping of one or more sensor architectures is determined manual and requires a technician to physically locate the sensor and determine the sensor is correctly located at the proper subsystem and/or component. However, as electrical systems increase in size and complexity, the increased number of sensors included in the overall system renders manually location mapping impractical.

The one-to-one wired connections also implicitly guarantee authentication of a particular sensor since severing an authentic wired sensor and replacing it with a false sensor is sufficiently difficult. Wireless interface systems create an open architecture, which is susceptible to unauthorized external manipulation and the formation and maintenance of authentication of the systems involved in the data transfer. For authentication to be maintained in a wireless system, a means of authenticating the sensors included in the electrical system is desired. Therefore, it is essential that data integrity is maintainable in order for these interfaces to be adopted in safety critical systems.

SUMMARY

Disclosed is a system to locate and map a data collection device includes at least one image. The image may be included with a subsystem or a component monitored by the system. A data collection device, such as a smart sensor, is configured to detect a stimulus and to capture the at least one image. The smart sensor is further configured to output an image signal indicating the at least one image. A main control module is in electrical communication with the at least one smart sensor. The main control module is configured to determine the image based on the image signal, and compare the at least one image to a stored image. The main control module is further configured to authenticate the at least one image in response to the at least one image matching the stored image. The main control module may include a main communication module to wirelessly communicate with the smart sensor as understood by those ordinarily skilled in the art.

According to another embodiment of the disclosure, a smart sensor comprises a sensing element, an image module and a sensor control module. The sensing element is configured to output a sensing signal in response to detecting a stimulus. The image module is configured to capture an image and generate an image signal. The sensor control module is configured to generate a data signal indicating the detected stimulus and the captured image. A communication module is configured to electrically communicate the data signal generated by the sensor control module to a main control module.

According to still another embodiment, a method of locating and mapping a data collection device included with an electrical system comprises detecting an image that indicates a location of the image and a desired sensing capability with respect to the location, and capturing the detected image via a smart sensor. The method further comprises wirelessly communicating via the smart sensor the captured image and an actual sensing capability of the smart sensor to a hardware control module. The method further comprises comparing the captured image to a stored image stored in a memory unit, and determining a location of the image, a location of the smart sensor, and the desired sensing capability with respect to the location based on the comparison. The method further comprises comparing the actual sensing capability of the smart sensor with the desired sensing capability. The method further comprises determining the smart sensor is located incorrectly when the actual sensing capability does not match the desired sensing capability.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of various examples and without limitation with reference to the Figures.

Various embodiments provide a sensor location and mapping system (hereinafter referred to as a sensor system) configured to logically map a physical location of an electronic data collection device, such as a sensor for example, using optical techniques. The sensor location system is also configured to identify and authenticate one or more data collection devices included in the sensor system to establish a secure communication between them. The sensor system may include both wireless and bus-wired configurations.

Figure 1:
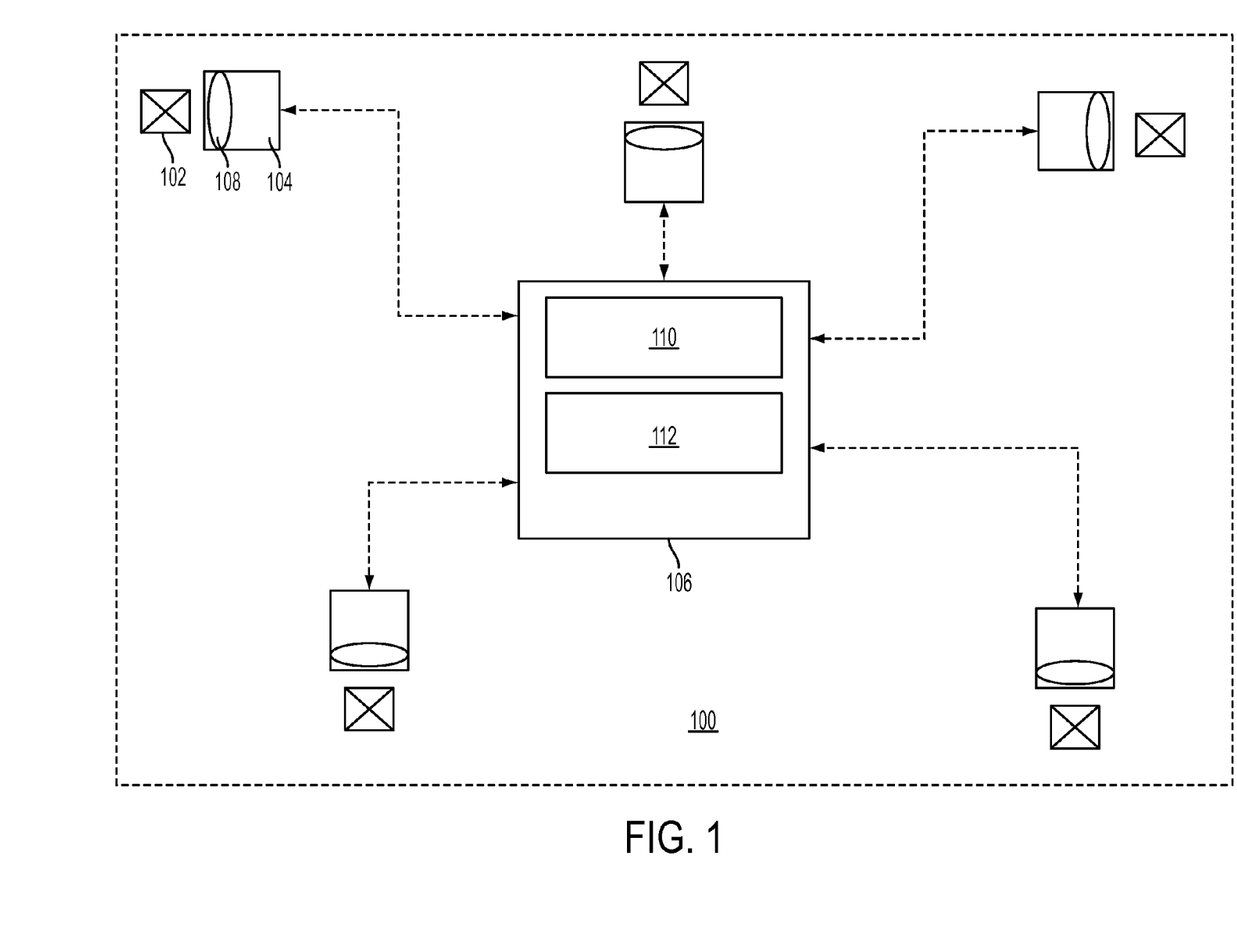
FIG. 1 is a block diagram illustrating a sensor location and mapping system configured to locate and map a plurality of image sensors according to an embodiment.
Figure 2:
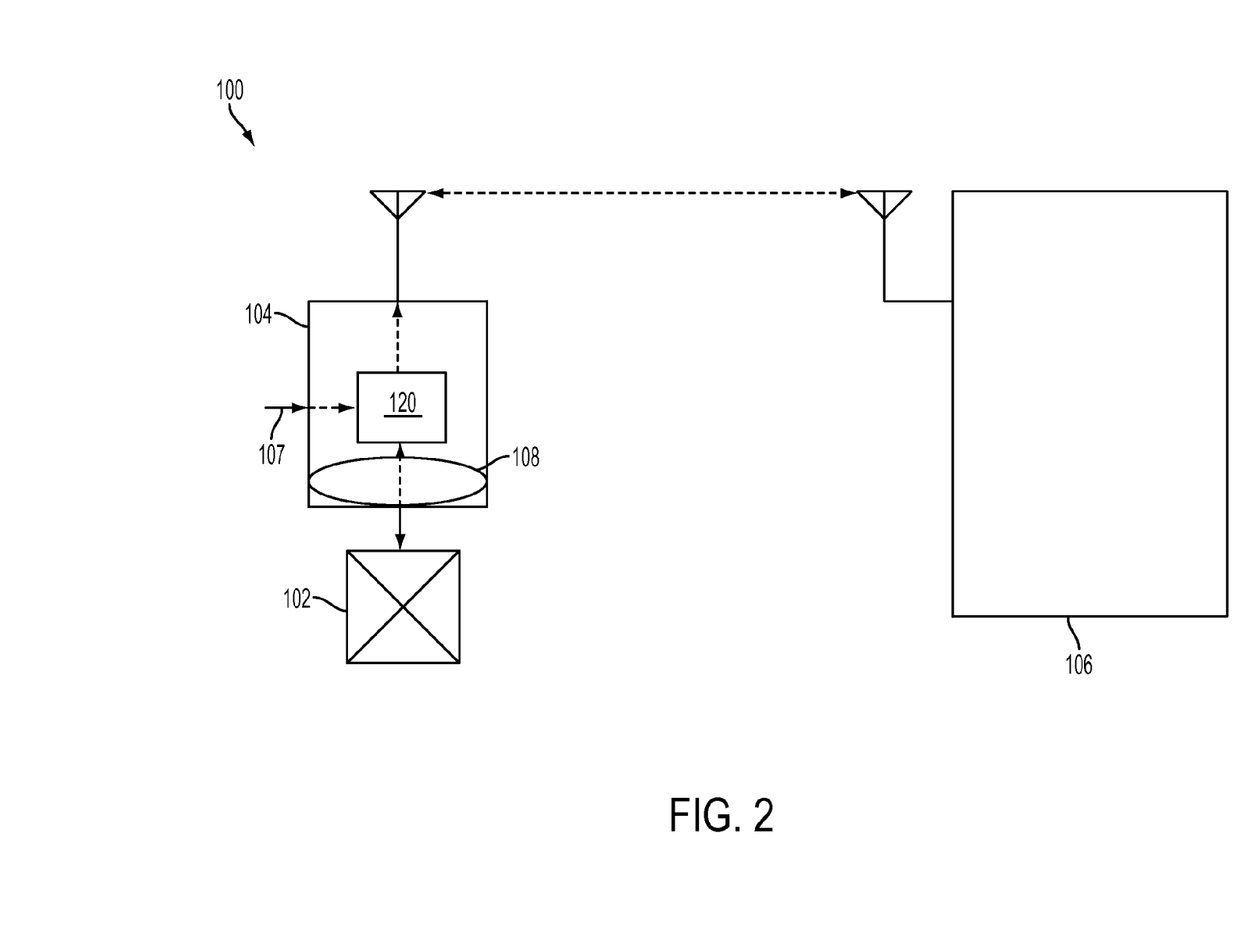
FIG. 2 is block diagram illustrating an image sensor communicating a disposed location in a sensor location system according to an embodiment.

In at least one embodiment as shown, for example, in FIGS. 1 and 2, the sensor location and mapping system 100 includes a data collection device mounted adjacent to a unique information-containing image. Going forward, the data collection device will be referred to as a "smart sensor." The smart sensor is configured to detect both images and environmental stimuli. In at least one embodiment, the smart sensor may relay the image to a control module, which is configured to identify a location and orientation of the sensor. The control module may also determine the expected function of the sensor with respect to the determined location based on the relayed image. Moreover, the smart sensor may generate secure codes/keys for initializing communication. The information in the image may be utilized by the control module to establish an unambiguous relationship between the image collecting system and other sub-systems corresponding to the sensor.

Referring now to FIG. 1, a block diagram illustrates an embodiment of a sensor location system and mapping 100 configured to locate and map a plurality of data collection devices, such as a sensor 104. The sensor location system 100 includes one or more identification (ID) images 102, one or more smart sensor 104, and a main control module 106. Some or all of the smart sensors 104 may detect data, such as images 102 and/or environmental stimuli, and electrically communicate the data to the main control module 106. Based on the data, the main control module 106 may perform various operations including, but not limited to, identifying the subsystem 100 containing a particular sensor 104, authenticating the sensor 104, diagnosing the sensor 104 and/or diagnosing the overall sensor location and mapping system 100, and/or a subsystem thereof. Operation of the main control module 106 is discussed in greater detail below.

The images 102 are configured to indicate ID information to the main control module 106. The ID information includes, but is not limited to, the location of where the image is formed, the subsystem 100 containing the image, the component including the image, and the type of smart sensor 104 (i.e., the desired sensing capability) that should be located at the image. The subsystem 100 may include, but is not limited to, a heating, ventilation, and air conditioning (HVAC) system, an engine system, a braking system, a cabin pressure system, a powertrain system and various actuator systems. The images 102 may include an optically machine-readable image capable of being attached to a surface and/or component. The optically machine-readable image records information related to attached surface or component. For example, the optically machine-readable image may be recorded with information to identify an HVAC system. The optically machine-readable image may then be formed on wall or flooring of a compartment containing HVAC components, or may be formed on a component configured to perform an HVAC operation. The optically machine-readable image may be formed as a quick response (QR) code, a bar code, a bitmap image, or any other image capable of identification information and/or identifying a corresponding component and/or area containing the component. In addition, images 102 may be formed using standard printing technology, mechanical formation, laser formation, chemical etching, or other means. The image may also include holographic image or three-dimensional images 102. Images 102 may also be generated by casting shadows onto an optically scanned surface, and by selective blocking or scattering a scanning signal. If multiple images 102 are included in the sensor system 100, different images 102 with respect one another may be used to identify different sensor 104 of the sensor system 100.

In the case of a QR code, for example, a plurality of black modules (square dots) may be arranged in a square grid on a white background image to form an image. The image indicates the information encoded by a QR code may be made up of various types of data including, but not limited to, numeric, alphanumeric, byte/binary, Kanji, pictorial, and human recognizable. The image may be captured and/or processed by the smart sensor 104, and may be further processed by the main control module 106 using Reed-Solomon error correction until the image can be appropriately interpreted. The data and information may then be extracted from the patterns present in both horizontal and vertical components of the image. Although a process of identifying an image using QR code has been described, it is appreciated that other images 102 may be used to determine and process the image information.

Images 102 may be formed on components at the time of manufacturing or may be formed on components by technicians installing the components. In addition, system design schematics may instruct where to form images 102 during installation of the overall system 100. Once the overall system 100 is installed and the images 102 are formed, technicians may dispose the smart sensor 104 in a viewing area of the image. For example, a smart sensor 104 may be disposed overtop an image such that the lens of the smart sensor 104 may read the image accordingly. Thus, the images 102 may instruct the technicians where to dispose the smart sensor 104.

One or more smart sensors 104 are configured to detect one or more of the images 102 described above and/or various stimuli (see FIG. 2). The stimuli may include, but are not limited to, light, pressure, temperature, vibration, sound, motion, and moisture. In response to detecting the stimuli, the smart sensor 104 generates a sensing signal indicating the detected stimuli as understood by those of ordinary skill in the art. In addition, the smart sensor 104 may be configured to generate a digital image signal indicating the captured image 102. The digital image signal may further include information indicating the actual sensing capability of the smart sensor 104. For example, if the smart sensor 104 is configured with a temperature sensing element to detect temperature, the smart sensor 104 may include data in the image signal indicating that the actual sensing capability is to detect temperature, as opposed to pressure, motion, moisture, etc.

The smart sensor 104 may include various optical units 108 configured to read and capture the images 102. The optical units 108 may include, but are not limited to, an optical scanner, bar-code-like scanners, cameras, mechanically scanned optical readers, individual photo-diodes, and other varieties of photodetectors. It is appreciated that various techniques to optically scan the image depending on the amount, type of information coded in the images 102, and how the image is formed may be used. In response to capturing the image, the smart sensor 104 generates an image signal and a sensor ID signal. The image signal indicates the captured image and the sensor ID signal indicates the type of the smart sensor 104. For example, the smart sensor 104 may output an image signal indicating a QR code captured by a camera unit and the sensor ID indicating the smart sensor 104 is temperature smart sensor configured to detect temperature. It is appreciated that the image signal and the sensor ID signal may be combined into a single signal, which may be communicated to the main control module 106.

The main control module 106 is in electrical communication with each smart sensor 104 to receive an image signal from a respective sensor 104. It is appreciated that one or more image signals may correspond to a single image. The main control module 106 includes an image database 110 and a smart sensor 104 database 112. The image database 110 stores one or more images 102 included in the sensor system 100. The main control module 106 may compare the image signal to the images 102 stored in the image database 110. If an image indicated by the image signal matches a stored image included in the database, the main control module 106 may determine that a particular smart sensor 104 that generated the image signal is an authentic smart sensor 104. In response to authenticating the smart sensor 104, the main control module 106 may automatically install the smart sensor 104 into the sensor system 100. Installation of the smart sensor 104 may include logging sensor ID information in a sensor database 112. In addition, the installation may include automatically authenticating the smart sensor 104, and authorizing the smart sensor 104 to transmit data in response to the being authenticated, as discussed in greater detail below.

The sensor database 112 may include a look-up table (LUT) storing various sensor identification (ID) information. For example, in response to authenticating the smart sensor 104, the main control module 106 may store the sensing capability of one or more smart sensors 104 (e.g., a temperature smart sensor 104, a pressure smart sensor 104, a motion smart sensor 104, etc.) and the location of the smart sensor 104 in the LUT. The sensor ID information may be cross-referenced in the LUT. For example, the main control module 106 may determine the sensing capability of the smart sensor 104 with respect to the location based on the LUT. Accordingly, the main control module 106 may logically map the smart sensor 104 installed in the sensor system 100 with the locations at which the smart sensor 104 are installed.

The main control module 106 may also compare the captured image with the stored image to determine whether the smart sensor 104 is installed at the appropriate location. For example, the main control module 106 may receive the image signal indicating a captured image and a sensing signal indicating a detected stimulus 107 (e.g., a detected pressure). The main control module 106 may compare the captured image to the stored image and may determine that the image is located in a thermal subsystem 100 requiring a temperature sensing means, whereas the smart sensor 104 is generating a sensing signal indicating motion. Accordingly, the main control module 106 may determine that an incorrect smart sensor 104 is installed at the location of the image, and may generate an alert indicating the improper smart sensor 104. The alert may include, but is not limited to, a graphical alert, log data retrieved from the sensor database 112, an illuminated alert, and/or a sound alert. The control module 106 may also automatically disable the sensor 104 and/or uninstall the sensor 104 from the sensor system 100 in response to determining the captured image does not match the stored image.

In at least one embodiment, the main control module 106 may generate an authentication signal in response to installing the sensor 104. The authentication signal indicates that the smart sensor 104 is authorized to communicate data to the main control module 106. In response to receiving the authentication signal, the smart sensor 104 may begin detecting environmental stimuli, and may communicate the sensing signal to the main control module 106. Accordingly, the main control module 106 may validate a smart sensor 104 located at a particular subsystem 100 and/or component and monitor the subsystem 100 and/or component based on the sensed data signal.

The main control module 106 may also utilize the image signal to confirm that one or more received sensing signals are generated by an authenticate sensor 104 installed in the sensor system 100, as opposed to a false sensing signal generated by an unauthorized source external from the sensor system 100, thereby determining whether a secure communication channel exists. For example, if a sensing signal is provided without an image signal indicating a captured image that matches a stored image of the database, the main control module 106 may determine that the sensing signal is not authentic.

The main control module 106 may also generate. More specifically, in response to receiving an image signal from a respective smart sensor 104, the control module 106 generates a public/private key (e.g., a password, passphrase, etc.), and sends the key to the smart sensor 104. The smart sensor 104 may be configured to generate a responsive key in response to receiving the public/private key from the main control module 106. If the response key matches the key generated by the main control module 106, the main control module 106 may determine the smart sensor 104 is authentic and may install the smart sensor 104 and/or allow the smart sensor 104 to communicate data accordingly. The public/private key generated by the main control may be encrypted and may be used to establish a future secure communication channel between the respective smart sensor 104 and the main control module 106.

Figure 3:
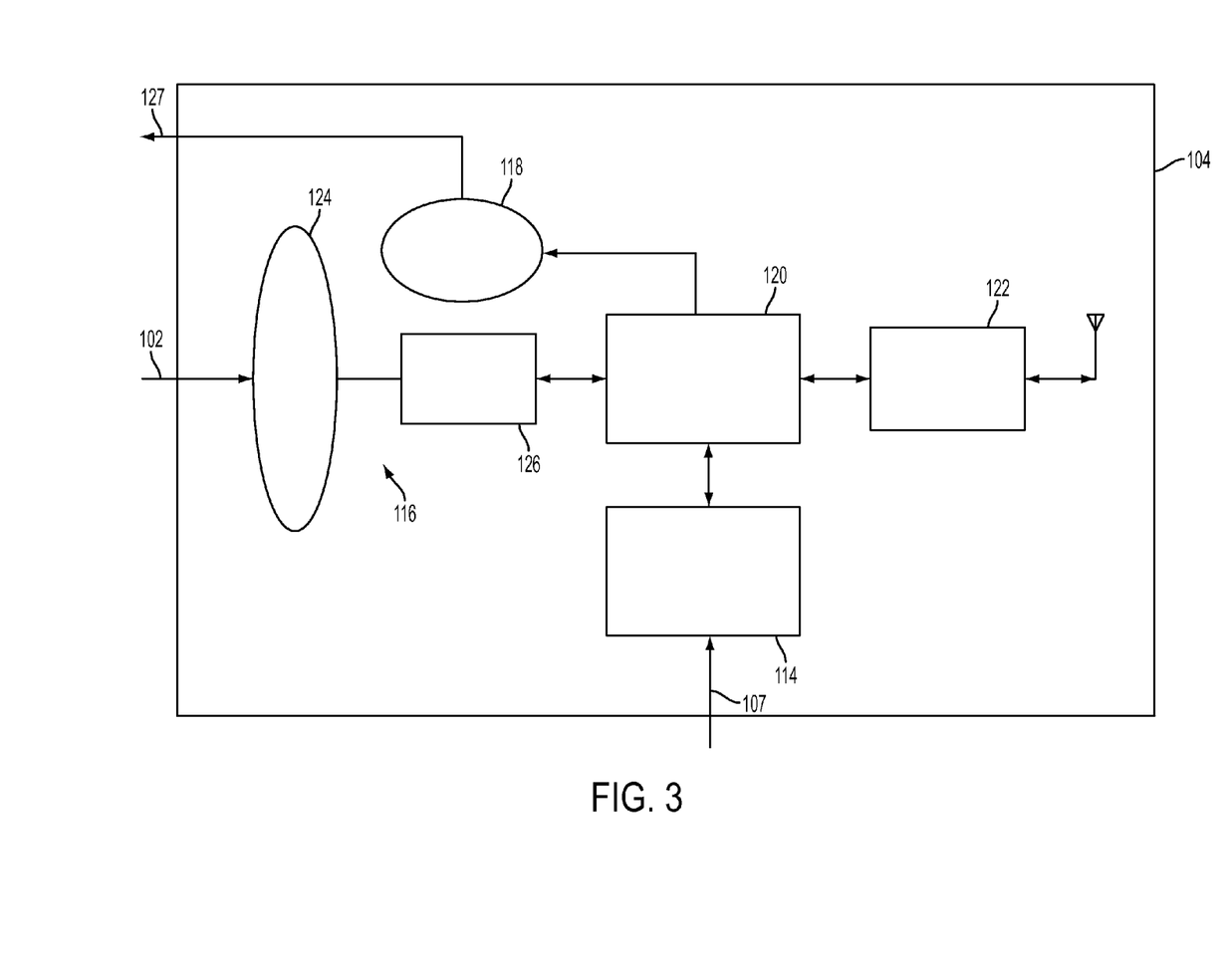
FIG. 3 is block diagram illustrating an image sensor included in a sensor location system according to an embodiment.

Turning to FIG. 3, a block diagram illustrates at least one embodiment of a smart sensor 104 included in the sensor system 100. The smart sensor 104 includes a sensing element 114, an image module 116, a light source 118, a sensor control module 120, and a sensor communication module 122. The smart sensor 104 is configured to electrically communicate a data signal to the main control module 106 indicating measured information detected by the sensing element 114 and image information captured by the image module 116.

The sensing element 114 may be configured to detect various stimuli including, but not limited to, light, pressure, temperature, vibration, sound, motion, and moisture. In response to detecting the stimuli, the sensing generates a sensing signal indicating the detected stimuli as understood by those of ordinary skill in the art.

The image module 116 is configured to receive and capture an image. In at least one embodiment, the image module 116 includes a lens 124 and a camera unit 126. The lens 124 may include various optical configurations capable of reading the image. The lens 124 may include, for example, a biconvex lens 124, a plano-convex lens 124, a positive meniscus lens 124, and negative meniscus lens 124, a plan-concave lens 124, a biconcave lens 124, a compound lens 124, wide-angle lens 124, or a fisheye lens 124. In addition, the smart sensor 104 is not limited to a single lens 124. Instead, multiple lenses may be used. In at least one embodiment, the lens 124 has a size slightly larger than a size of the image. Accordingly, only a single image is received by the lens 124 such that the possibility of sending multiple different images 102 from a single sensor 104 may be avoided.

The camera unit 126 captures the image received by the lens 124. Further, the camera unit 126 may generate a digital image signal based on the received image. That is, the digital image signal is a digital signal indicating the image received by the lens 124. A light source 118 may also be provided to output light 127 and illuminate the area including the image. Accordingly, the image may be more accurately captured. The light source 118 may include, but is not limited to, a lamp, a laser, and/or one or more light emitting diodes (LEDs).

The sensor control module 120 is configured to detect both the image captured by the camera and/or a local stimulus. In the case where the smart sensor 104 is a pressure smart sensor 104, for example, the smart sensor 104 is configured to detect a pressure stimulus and/or to read an image. The smart sensor 104 unit receives the pressure stimulus and generates a pressure signal indicating the pressure realized by the smart sensor 104. The smart sensor 104 unit may also receive the digital image signal output from the camera unit 126. In response to receiving the sensing signal and/or the digital image signal, the sensor control module 120 may generate a smart sensor 104 data signal. In at least one embodiment, the sensor control module 120 combines the sensing signal and the image signal into a single data signal. It is appreciated that the sensor control module 120 may output the sensing signal to a system 100 control module 106 configured to monitor various subsystems and/or components, while also outputting the image signal to a separate image processing module configured to process the image signal as discussed above.

The sensor communication module 122 is configured to electrically communicate the sensor data signal to the main control module 106. As mentioned above, the communication module 122 may electrically communicate a single sensor 104 data signal, or may simultaneously communicate the sensing signal to a system 100 control module 106 configured, while also outputting the image signal to a separate image processing module. According to at least one embodiment illustrated in FIG. 3, the sensor communication module 122 may be configured as a transceiver capable of transmitting and/or receiving data to and from the main control module 106, or other various control modules of the sensor system 100.

Figure 4:
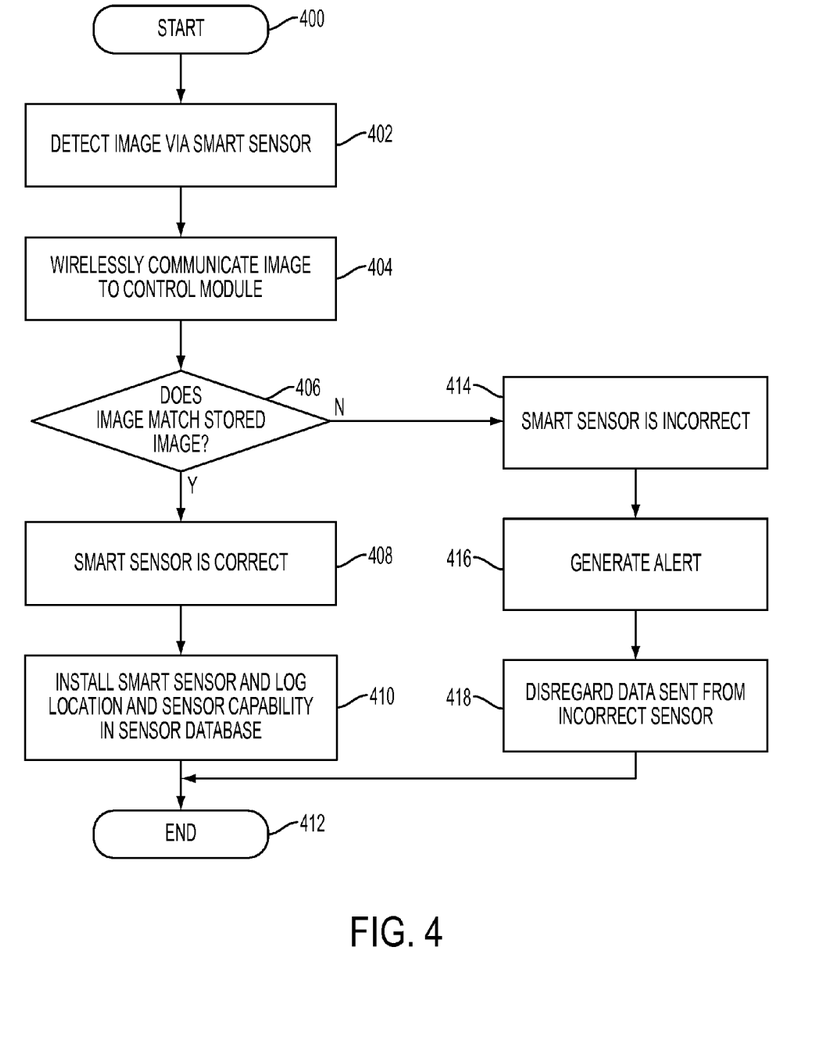
FIG. 4 is a flow diagram illustrating a method of locating and mapping a data collection device included with an electrical system.

Turning now to FIG. 4, a flow diagram illustrates a method of locating and mapping a data collection device included with an electrical system. The method begins at operation 400 and proceeds to operation 402 where an image is detected via a smart sensor. At operation 404, the detected image is communicated to a main control module. In at least one embodiment, the detected image is communicated wirelessly. At operation 406, a comparison between the detected image and a stored image is performed. An image database of the main control module may store one or more images, for example. If the detected image matches the stored image, the smart sensor is determined as a correct smart sensor at operation 408. A correct smart sensor may include a sensor having a proper sensing capability with respect to the current location of the smart sensor. A correct smart sensor may also include a sensor that is located within the electrical system, as opposed to a signal output from an authorized electrical device located externally from the electrical system. At operation 410, the smart sensor is installed in the electrical system, and the location and/or sensing capability of the smart sensor may be logged in a sensor database. The installation may include authorization from the main control module to allow communication of sensing data from the smart sensor. After installing and logging the smart sensor, the method ends at operation 412.

If the detected image does not match the stored image, the smart sensor is determined as incorrect at operation 414. An incorrect smart sensor may include a sensor having an improper sensing capability with respect to the current location of the smart sensor. An incorrect smart sensor may also include a device located externally from the electrical system which is attempting to communicate false sensing data to the main control module. At operation 416, an alert is generated indicating the smart sensor is incorrect. At operation 418, data output from the incorrect smart sensor is disregarded, and the method ends at operation 412.

As described in detail above, various embodiments provide a sensor location and mapping system configured to logically map and log a physical location of an electronic data collection device, such as a sensor for example, using optical techniques. The sensor location system is also configured to identify and authenticate one or more data collection devices included in the sensor system 100 to establish a secure communication between them.

While the inventive teachings have been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the inventive teachings without departing from the essential scope thereof. Therefore, it is intended that the inventive teachings not be limited to a particular embodiment disclosed, but that the invention will include various embodiments, including various modification falling within the scope of the claims.

What is claimed is:

1. A system to locate and map a data collection device included with the system comprising:
    at least one image included with at least one of a subsystem and a component monitored by the system;
    at least one smart sensor configured to detect a stimulus and to capture the at least one image, and configured to output an image signal indicating the at least one image; and
    a main control module in electrical communication with the at least one smart sensor, the main control module configured to determine the image based on the image signal, compare the at least one image to a stored image, and to authenticate the at least one image in response to the at least one image matching the stored image,
    wherein the main control module determines a location of the image based on the image signal generated by the at least one smart sensor, and determines that the location of the at least one sensor is incorrect when the at least one image does not match the stored image.

2. The system of claim 1, wherein the main control module automatically installs the at least one smart sensor in response to the at least one image matching the stored image.

3. The system of claim 2, wherein the main control module includes an image database that stores a plurality of different stored images, and a sensor database that stores a look-up tale (LUT), the main control storing a sensing capability of the at least one smart sensor and a location of the at least one smart sensor in the LUT.

4. The system of claim 3, wherein the main control module is configured to determine the sensing capability of the at least one smart sensor with respect to the location based on the LUT.

5. The system of claim 1, wherein the main control module controls operation of the at least one smart sensor based on the comparison between the at least one image and the stored image.

6. The system of claim 5, wherein the at least one smart sensor is prevented from communicating with the main control module until receiving an authentication signal.

7. The system of claim 6, wherein the main control module generates an authentication signal in response to the at least one image matching the stored image, the at least one sensor outputting a sensing signal indicating the stimulus to the main control module in response to receiving the authentication signal.

8. The system of claim 7, wherein the main control module automatically uninstalls the at least one smart sensor when the at least one image does not match a stored image among the plurality of stored images.

9. The system of claim 8, wherein the main control module generates an alert in response to determining at least one of the incorrect location or that the at least one smart sensor is not authentic.

10. A method of locating and mapping a data collection device included with an electrical system, the method comprising:

detecting an image that indicates a location of the image and a desired sensing capability with respect to the location, and capturing the detected image via a smart sensor;

wirelessly communicating via the smart sensor the captured image and an actual sensing capability of the smart sensor to a hardware control module;

performing a first comparison that compares the captured image to a stored image stored in a memory unit; and     based on the first comparison, determining a location of the image, a location of the smart sensor, and the desired sensing capability with respect to the location based on the comparison;

performing a second comparison that compares the actual sensing capability of the smart sensor with a desired sensing capability; and     determining the smart sensor is located incorrectly when the actual sensing capability does not match the desired sensing capability.

11. The method of claim 10, further comprising automatically installing the smart sensor in response to the at least one image matching the stored image such that the smart sensor is authorized to transmit measured stimuli to the hardware control module.

12. The method of claim 10, further comprising determining a sensing signal indicating a measured stimulus is generated by an unauthenticated device when the captured image does not match at least one stored image included in the memory unit.

13. The method of claim 12, wherein the smart sensor is automatically uninstalled from the electrical system in response to the actual sensing capability failing to match the desired sensing capability.

\* \* \* \* \*